(12) United States Patent
Maruoka et al.

(10) Patent No.: US 11,060,800 B2
(45) Date of Patent: Jul. 13, 2021

(54) LATENT HEAT STORAGE DEVICE

(71) Applicant: TOHOKU UNIVERSITY, Sendai (JP)

(72) Inventors: Nobuhiro Maruoka, Sendai (JP); Hiroshi Nogami, Sendai (JP); Taichi Tsutsumi, Sendai (JP); Akihisa Ito, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 28 days.

(21) Appl. No.: 16/326,099

(22) PCT Filed: Aug. 18, 2017

(86) PCT No.: PCT/JP2017/029687
§ 371 (c)(1),
(2) Date: Feb. 15, 2019

(87) PCT Pub. No.: WO2018/034352
PCT Pub. Date: Feb. 22, 2018

(65) Prior Publication Data
US 2019/0186844 A1 Jun. 20, 2019

(30) Foreign Application Priority Data
Aug. 19, 2016 (JP) .............................. JP2016-161454

(51) Int. Cl.
*F28D 20/02* (2006.01)
*F28F 5/02* (2006.01)
*F28F 19/00* (2006.01)

(52) U.S. Cl.
CPC ............ *F28D 20/02* (2013.01); *F28D 20/021* (2013.01); *F28F 5/02* (2013.01); *F28F 19/008* (2013.01); *Y02E 60/14* (2013.01)

(58) Field of Classification Search
CPC ........ F28D 11/04; F28D 20/02; F28D 20/021; F28D 2021/0019; F28F 1/14; F28F 5/02;
(Continued)

(56) References Cited

U.S. PATENT DOCUMENTS 4,126,177 A * 11/1978 Smith ................... F28F 19/008
165/109.1
4,824,257 A * 4/1989 List ......................... B01F 7/048
366/99
(Continued)

FOREIGN PATENT DOCUMENTS

DE 102009005637 A1 * 7/2010 ............ F28F 13/125
EP 0789214 A2 * 8/1997 ........... F28D 20/025
(Continued)

OTHER PUBLICATIONS

Machine Translation JP2005009804A (Year: 2005).*
(Continued)

*Primary Examiner* — Len Tran
*Assistant Examiner* — Gustavo A Hincapie Serna
(74) *Attorney, Agent, or Firm* — Oliff PLC

(57) ABSTRACT

A latent heat storage device includes: a heat transfer cylindrical body allowing a flow of a heat medium inside thereof and being rotatable about a longitudinal axis as a center of rotation; a fixed blade being adjacent to or in a slidable contact with an outer peripheral surface of the heat transfer cylindrical body; and a latent heat storage material disposed around the heat transfer cylindrical body, wherein by rotation of the heat transfer cylindrical body, the fixed blade scrapes a solidified body of the latent heat storage material adhering to the outer peripheral surface of the heat transfer cylindrical body off the outer peripheral surface of the heat transfer cylindrical body, and creates circulation of the latent heat storage material.

5 Claims, 9 Drawing Sheets

(58) Field of Classification Search
CPC .......... F28F 13/04; F28F 19/00; F28F 19/008; Y02E 60/145
USPC .............. 165/4, 10, 94, 109.1, 120; 126/400
See application file for complete search history.

(56) References Cited

U.S. PATENT DOCUMENTS

| | | | | |
|---|---|---|---|---|
| 5,042,573 | A | * | 8/1991 | Hendriks .................. A23G 9/16 165/94 |
| 5,165,469 | A | * | 11/1992 | Smith .................... F28F 19/008 165/94 |
| 5,220,954 | A | * | 6/1993 | Longardner .......... F28D 20/021 165/10 |
| 6,196,296 | B1 | * | 3/2001 | Wisniewski .......... F25D 31/006 165/109.1 |
| 8,671,678 | B2 | * | 3/2014 | Ostlund .................... F03G 7/06 60/527 |
| 10,297,818 | B2 | * | 5/2019 | Iwasaki .................... H01M 4/62 |
| 2011/0120131 | A1 | * | 5/2011 | Ostlund .................. F28D 20/02 60/670 |
| 2013/0032316 | A1 | * | 2/2013 | Dhiman ................ B08B 17/065 165/133 |
| 2015/0013178 | A1 | * | 1/2015 | Stolze ..................... D06F 58/26 34/282 |
| 2016/0061533 | A1 | | 3/2016 | Hashiba et al. |
| 2016/0102854 | A1 | * | 4/2016 | Xiang ..................... F21V 29/71 362/373 |
| 2017/0106310 | A1 | * | 4/2017 | Astoria .................. B01D 1/225 |

FOREIGN PATENT DOCUMENTS

| | | | | |
|---|---|---|---|---|
| JP | S52-137745 | A | | 11/1977 |
| JP | S58-221388 | A | | 12/1983 |
| JP | S60-186642 | A | | 9/1985 |
| JP | H0259042 | A | * | 2/1990 |
| JP | 05203201 | A | * | 8/1993 |
| JP | H9-291272 | A | | 11/1997 |
| JP | 2005-9804 | A | | 1/2005 |
| JP | 2005009804 | A | * | 1/2005 |
| JP | 2005-140390 | A | | 6/2005 |
| JP | 2007-101030 | A | | 4/2007 |
| JP | 2008111615 | A | * | 5/2008 |
| JP | 2011-80657 | A | | 4/2011 |
| JP | 2011080657 | A | * | 4/2011 |
| WO | WO-2009126080 | A1 | * | 10/2009 .............. F03G 7/06 |
| WO | 2010/008329 | A1 | | 1/2010 |
| WO | WO-2010008329 | A1 | * | 1/2010 ............... F28F 1/14 |
| WO | 2014/185179 | A1 | | 11/2014 |

OTHER PUBLICATIONS

Machine translation JP2011080657A (Year: 2011).*
Machine Translation JPH0259042 (Year: 1990).*
Machine Translation JP2008111615A (Year: 2008).*
Oct. 31, 2017 International Search Report issued in International Patent Application PCT/JP2017/029687.

* cited by examiner

LATENT HEAT STORAGE DEVICE

TECHNICAL FIELD

The present invention relates to a latent heat storage device.

BACKGROUND ART

Multistage use of energy or so-called heat cascading is important for reduction in amount of energy used or amount of $CO_2$ emission, and heat storage is drawing attention as a technique to realize the heat cascading. Latent heat storage-type heat exchangers each using a phase change material (PCM) that can store heat at high density by using latent heat at the time of solid-liquid phase transformation have been proposed as one of such heat storage techniques (Japanese Unexamined Patent Application Publication No. 2005-140390 and Japanese Unexamined Patent Application Publication No. 2007-101030 (PTL 2)). However, due to a solidification phase with low heat conductivity generated at the time of heat release, such a conventional latent heat storage-type heat exchanger has low heat transfer rates (a heat release rate and a heat storage rate) between a latent heat storage material and a heat medium and a lower amount of heat that can be released (an effective heat utilization percentage) as compared to a theoretical amount of heat storage calculated from an amount of the latent heat storage material loaded.

Meanwhile, Japanese Unexamined Patent Application Publication No. 2005-9804 (PTL 3) and Japanese Unexamined Patent Application Publication No. 2011-80657 (PTL 4) disclose heat exchangers each including: a heat transfer cylindrical body; inner fixed blades being disposed inside the heat transfer cylindrical body and being located adjacent to or in slidable contact with an inner peripheral surface of the heat transfer cylindrical body to scrape a boundary film off; and outer fixed blades being located adjacent to or in slidable contact with an outer peripheral surface of the heat transfer cylindrical body to scrape a boundary film off, the heat exchangers being configured to perform heat exchange between fluids having a difference in temperature and flowing inside and outside the heat transfer cylindrical body, respectively, by the intermediary of the heat transfer cylindrical body. However, these heat exchangers are intended for the heat exchange between liquids, between gases, or between a liquid and a gas.

CITATION LIST

Patent Literature

[PTL 1] Japanese Unexamined Patent Application Publication No. 2005-140390
[PTL 2] Japanese Unexamined Patent Application Publication No. 2007-101030
[PTL 3] Japanese Unexamined Patent Application Publication No. 2005-9804
[PTL 4] Japanese Unexamined Patent Application Publication No. 2011-80657

SUMMARY OF INVENTION

Technical Problem

The present invention has been made in view of the above-mentioned problems of the conventional techniques, and an object thereof is to provide a latent heat storage device that brings about a large amount of heat release (a large effective heat utilization percentage) and has an excellent heat transfer performance between a latent heat storage material and a heat medium.

Solution to Problem

As a result of earnest studies carried out in order to attain the object, the inventors of the present invention have found out that an amount of heat release (an effective heat utilization percentage) is increased and heat transfer rates (a heat release rate and a heat storage rate) between a latent heat storage material and a heat medium are increased in a latent heat storage device with the latent heat storage material disposed around a heat transfer cylindrical body that allows a flow of the heat medium inside thereof, by installing a fixed blade in such a way as to be adjacent to or in slidable contact with an outer peripheral surface of the heat transfer cylindrical body and rotating the heat transfer cylindrical body about its longitudinal axis as the center, thus having accomplished the present invention.

Specifically, a latent heat storage device of the present invention includes: a heat transfer cylindrical body allowing a flow of a heat medium inside thereof and being rotatable about a longitudinal axis as a center of rotation; a fixed blade being adjacent to or in a slidable contact with an outer peripheral surface of the heat transfer cylindrical body; and a latent heat storage material disposed around the heat transfer cylindrical body, wherein by rotation of the heat transfer cylindrical body, the fixed blade scrapes a solidified body of the latent heat storage material adhering to the outer peripheral surface of the heat transfer cylindrical body off the outer peripheral surface of the heat transfer cylindrical body, and creates circulation of the latent heat storage material.

In the latent heat storage device of the present invention, a width of the fixed blade is preferably equal to or above 15% of a diameter of the heat transfer cylindrical body. Meanwhile, in the latent heat storage device of the present invention, an outer cylinder may be disposed around the heat transfer cylindrical body while providing a given space in between, and the fixed blade and the latent heat storage material may be disposed in the space between the heat transfer cylindrical body and the outer cylinder. In this case, the width of the fixed blade is preferably not less than 30% and not more than 100% of a width of the space between the heat transfer cylindrical body and the outer cylinder.

Meanwhile, in the latent heat storage device of the present invention, one end portion of the heat transfer cylindrical body may be closed, and a heat medium introduction pipe configured to introduce the heat medium from another end portion of the heat transfer cylindrical body into the vicinity of the closed end portion in the heat transfer cylindrical body may be disposed in the heat transfer cylindrical body. In this case, the heat medium flows from the vicinity of the closed end portion to the other end portion in the heat transfer cylindrical body by introducing the heat medium into the heat transfer cylindrical body through the heat medium introduction pipe.

Moreover, in the latent heat storage device of the present invention, a filler in liquid form and immiscible with the latent heat storage material is preferably disposed between the outer peripheral surface of the heat transfer cylindrical body and the latent heat storage material.

Here, the inventors of the present invention are confident that the reasons why an amount of heat release is increased and a heat transfer rate between the latent heat storage material and the heat medium becomes faster are as follows. Specifically, in the conventional latent heat storage device in which the latent heat storage material that allows a flow of the heat medium inside is disposed around the heat transfer cylindrical body, the latent heat storage material is solidified in the vicinity of the outer peripheral surface of the heat transfer cylindrical body at the time of heat release, and the solidified body of the latent heat storage material therefore adheres to the outer peripheral surface of the heat transfer cylindrical body. The solidified body of the latent heat storage material transfers the heat only by way of heat conduction, and therefore has large heat transfer resistance and blocks the heat transfer from the latent heat storage material to the heat medium at the time of heat release. Accordingly, the heat transfer rate from the latent heat storage material to the heat medium becomes slower. In addition, of the heat held by the latent heat storage material in liquid form located at a section spatially far from the outer peripheral surface of the heat transfer cylindrical body, only the heat in the vicinity of an interface between the solidified body and the liquid of the latent heat storage material is used. As a consequence, the amount of heat release is reduced as well. Meanwhile, in an initial stage of a heat storage operation, the heat transfer is slow in the solidified body of the latent heat storage material and the solidified body of the latent heat storage material is gradually transformed into the liquid form from the vicinity of the outer peripheral surface of the heat transfer cylindrical body. In the meantime, in a middle stage to a late stage of the heat storage, a motion of the latent heat storage material turned into the liquid form is generated only by way of natural convection, and a space where the circulation is created is small. As a consequence, the motion of the latent heat storage material is very weak and supply of the heat to the solidified body located spatially far from the heat transfer cylindrical body is mainly achieved only by the heat conduction within the latent heat storage material in liquid form, and the heat storage rate becomes slower.

On the other hand, in the latent heat storage device of the present invention, the fixed blade is installed in such a way as to be adjacent to or in slidable contact with the outer peripheral surface of the heat transfer cylindrical body, and the heat transfer cylindrical body is rotated about its longitudinal axis as the center. Accordingly, even if the solidified body of the latent heat storage material adheres to the outer peripheral surface of the heat transfer cylindrical body at the time of heat release, the solidified body of the latent heat storage material is scraped off the outer peripheral surface of the heat transfer cylindrical body by the fixed blade. Thus, the heat transfer from the latent heat storage material to the heat medium is not blocked and the heat transfer rate becomes faster. Moreover, the latent heat storage material is agitated by the circulation of the latent heat storage material, which is created by rotation of the heat transfer cylindrical body and by the fixed blade. This makes it possible to extract the entire amount of heat held by the latent heat storage material whereby the amount of heat release is increased as well. Furthermore, at the time of heat storage, the latent heat storage material transformed from the solidified body into the liquid form in the vicinity of the outer peripheral surface of the heat transfer cylindrical body circulates by using the rotation of the heat transfer cylindrical body as a driving force, and this circulation collides with the fixed blade and thus creates a flow in a direction perpendicular to the outer peripheral surface of the heat transfer cylindrical body (a radial direction). Accordingly, the heat is transmitted to the solidified body of the latent heat storage material, which is located at the section spatially far from the heat transfer cylindrical body, at a higher rate than that by the heat conduction. In addition, the latent heat storage material is agitated uniformly. As a consequence, the heat storage rate becomes faster.

Advantageous Effects of Invention

According to the present invention, it is possible to obtain a latent heat storage device that brings about a large amount of heat release and has an excellent heat transfer performance between a latent heat storage material and a heat medium.

DESCRIPTION OF EMBODIMENTS

Figure 1A:
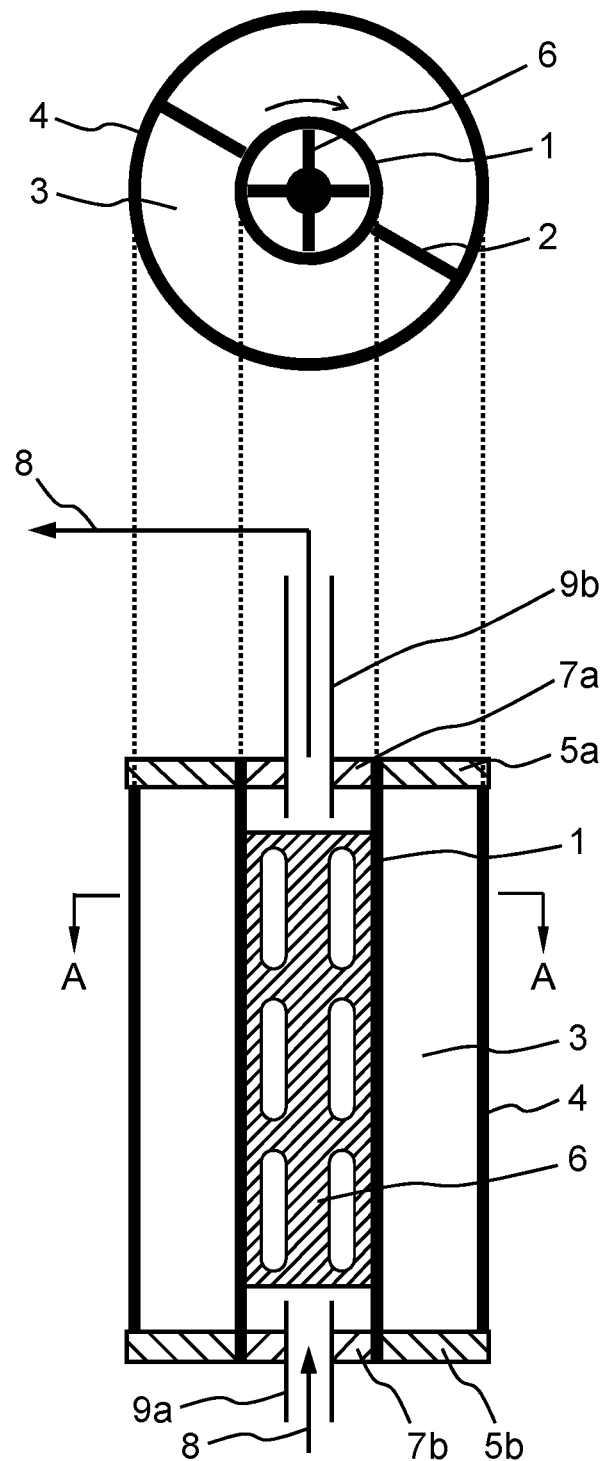
FIG. 1A is a cross-sectional view showing an embodiment of a latent heat storage device of the present invention.

Preferred embodiments of the present invention will be described in detail below with reference to the drawings. Nevertheless, the present invention is not limited to the aforementioned drawings. In the following description and in the drawings, it is to be noted that identical or corresponding elements are denoted by the same reference signs and overlapping explanations may be omitted.

Figure 1B:
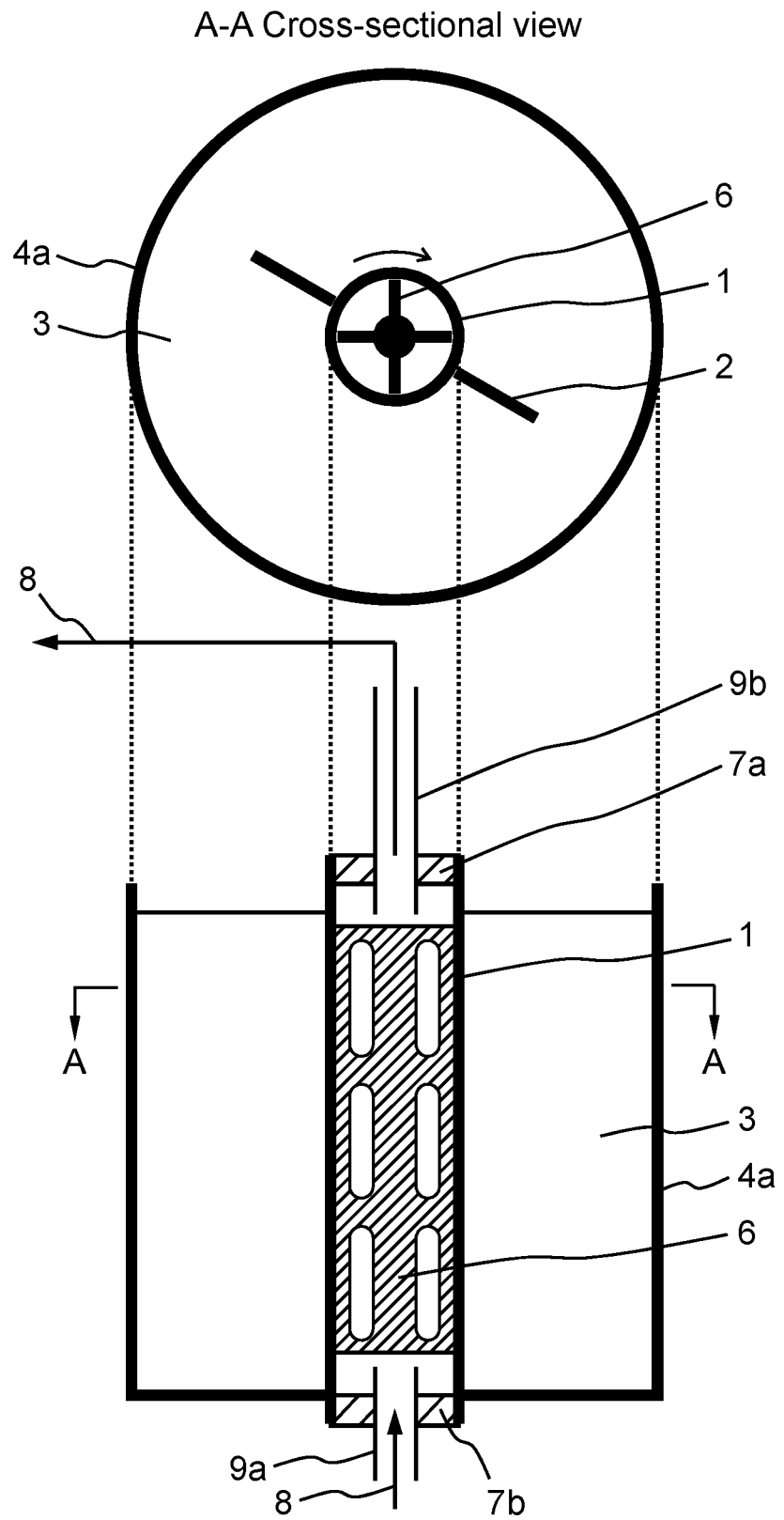
FIG. 1B is a cross-sectional view showing another embodiment of the latent heat storage device of the present invention.

FIG. 1A is a cross-sectional view showing an embodiment of a latent heat storage device of the present invention. The latent heat storage device of the present invention shown in FIG. 1A includes a heat transfer cylindrical body 1, fixed blades 2, and a latent heat storage material 3, in which the latent heat storage material 3 is hermetically sealed with an outer cylinder 4 and blocking members 5a and 5b. However, the latent heat storage device of the present invention is not limited to this configuration as long as the latent heat storage material 3 is disposed around the heat transfer cylindrical body 1. For example, as shown in FIG. 1B, the latent heat storage material 3 may be housed in an outer cylinder container 4a in which the heat transfer cylindrical body 1 and the fixed blades 2 are installed, and which has its upper part open. In the meantime, a filler which is immiscible with the latent heat storage material 3 and is in liquid form under a temperature condition at the time of heat exchange (at the time of heat release and at the time of heat storage) is preferably disposed between an outer peripheral surface of the heat transfer cylindrical body 1 and the latent heat storage material 3 in the latent heat storage device of the present invention.

The inside of the heat transfer cylindrical body 1 according to the present invention is made hollow so as to enable a flow of a heat medium inside thereof. Meanwhile, the heat transfer cylindrical body 1 is rotatable about its longitudinal axis as the center of rotation. The material of the above-mentioned heat transfer cylindrical body 1 is not limited to a particular material as long as the material has good heat conductivity, and examples of which include copper and the like. In the meantime, as shown in cross-sectional views taken along the A-A lines in FIG. 1A and FIG. 1B, fixed blades 6 (inner fixed blades) in a state of non-rotation may be installed inside the heat transfer cylindrical body 1 in such a way as to be adjacent to or in slidable contact with an inner peripheral surface. There may be provided just one or two or more pieces of such inner fixed blades 6. The inner fixed blade 6 plays a role in scraping off a boundary film of the heat medium, which is formed in the vicinity of the inner peripheral surface of the heat transfer cylindrical body 1, by rotation of the heat transfer cylindrical body 1. In this way, heat transfer resistance in the vicinity of the inner peripheral surface of the heat transfer cylindrical body 1 is reduced and heat transfer rates between the heat transfer cylindrical body 1 and the heat medium become faster.

In the latent heat storage device of the present invention, the fixed blades 2 (outer fixed blades) in a state of non-rotation are disposed in such a way as to be adjacent to or in slidable contact with the outer peripheral surface of the heat transfer cylindrical body 1. Particularly, in the latent heat storage device (FIG. 1A) of the present invention in which the outer cylinder 4 is disposed around the heat transfer cylindrical body 1 and in the latent heat storage device (FIG. 1B) of the present invention in which the heat transfer cylindrical body 1 is installed in the outer cylinder container 4a with the open upper part, the fixed blades 2 (the outer fixed blades) are disposed in a given space between the heat transfer cylindrical body 1 and the outer cylinder 4 or a side portion of the outer cylinder container 4a. There may be provided just one or two or more pieces of such outer fixed blades 2. The outer fixed blade 2 plays a role in scraping a solidified body of the latent heat storage material 3 adhering to the outer peripheral surface of the heat transfer cylindrical body 1 at the time of heat release off the outer peripheral surface of the heat transfer cylindrical body 1, by rotation of the heat transfer cylindrical body 1. In this way, heat transfer resistance in the vicinity of the outer peripheral surface of the heat transfer cylindrical body 1 is reduced and heat transfer rates between the heat transfer cylindrical body 1 and the latent heat storage material 3 become faster. In the meantime, the rotation of the heat transfer cylindrical body 1 creates circulation of the latent heat storage material 3 that agitates the latent heat storage material 3. Accordingly, it is possible to utilize an entire amount of heat held by the latent heat storage material 3 whereby an amount of heat release is increased. Moreover, the circulation of the latent heat storage material 3 created by the rotation of the heat transfer cylindrical body 1 generates a motion in a direction perpendicular to the outer peripheral surface of the heat transfer cylindrical body 1 (a radial direction) owing to the installation of the outer fixed blades 2, and the agitation of the latent heat storage material 3 is intensified.

At the time of heat release, the solidified body of the latent heat storage material 3 is gradually transformed into a liquid form from the vicinity of the outer peripheral surface of the heat transfer cylindrical body 1, and the heat supplied from a heat medium 8 is transferred to the solidified body via the latent heat storage material in liquid form. In this instance, the latent heat storage material 3 transformed from the solidified body into the liquid form flows in the vicinity of the outer peripheral surface of the heat transfer cylindrical body 1 by the rotation of the heat transfer cylindrical body 1. A convection heat transfer rate owing to the circulation of the latent heat storage material 3 turned in liquid form is larger than a conduction heat transfer rate in the latent heat storage material 3 at rest, and a heat storage rate therefore becomes faster. Moreover, this circulation collides with one of the outer fixed blades 2 to create another flow in a direction perpendicular to the outer peripheral surface of the heat transfer cylindrical body 1. In the meantime, the latent heat storage material 3 is agitated uniformly whereby the heat transfer from the heat transfer cylindrical body 1 to the latent heat storage material 3 is promoted and the effect of increase in heat storage rate is intensified.

Figure 2:
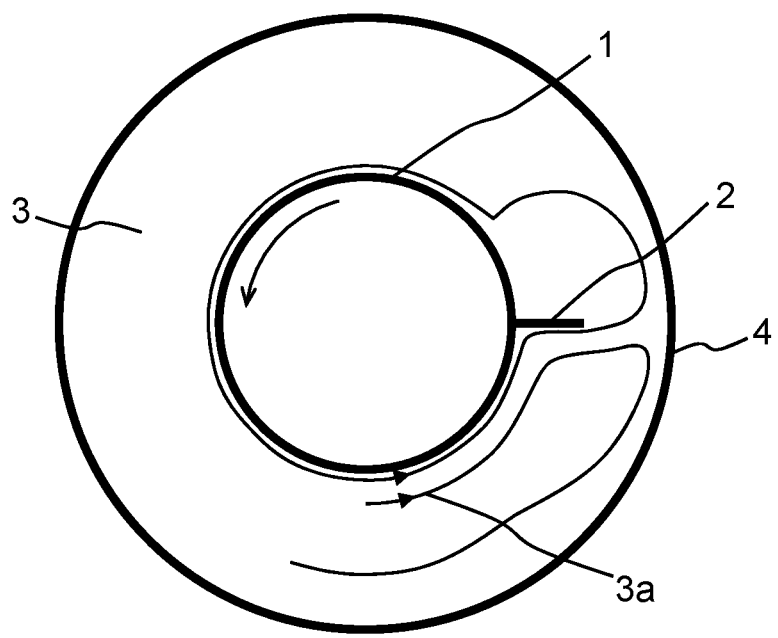
FIG. 2 is a schematic diagram showing a state of circulation of a latent heat storage material in the latent heat storage device of the present invention.

The width of the above-described outer fixed blade 2 is not limited to a particular width. However, a preferable width is one with which a latent heat storage material 3a at a position away by about 3 mm from the outer peripheral surface of the heat transfer cylindrical body 1 does not get over the outer fixed blade 2 as shown in FIG. 2. Thus, the latent heat storage material 3 is agitated uniformly and the heat storage rate becomes faster. While the aforementioned width of the outer fixed blade 2 is appropriately set depending on diameters of the heat transfer cylindrical body 1, the outer cylinder 4, and the outer cylinder container 4a, on a speed of rotation of the heat transfer cylindrical body 1, and so forth, the width is preferably equal to or above 15% of the diameter of the heat transfer cylindrical body 1, more preferably equal to or above 30% thereof, or particularly preferably equal to or above 50%, for example. While an upper limit of the width of the outer fixed blade 2 is not particularly limited either, the width is preferably equal to or below 100% of the diameter of the heat transfer cylindrical body 1. Meanwhile, in a case where the outer fixed blade 2 is disposed in the space between the heat transfer cylindrical body 1 and the outer cylinder 4 or the side portion of the outer cylinder container 4a due to the outer cylinder 4 being disposed around the heat transfer cylindrical body 1 (FIG. 1A) or the heat transfer cylindrical body 1 being installed in the outer cylinder container 4a with its upper part open (FIG. 1B), the width of the outer fixed blade 2 is preferably not less than 30% and not more than 100% of a width of the space between the heat transfer cylindrical body 1 and the outer cylinder 4 or the side portion of the outer cylinder container 4a, more preferably not less than 40% and not more than 100% thereof, or particularly preferably not less than 50% and not more than 100% thereof. By using the outer fixed blade 2 having the above-mentioned width, the latent heat storage material 3 is agitated even more uniformly and the heat storage rate becomes even faster.

Meanwhile, in the latent heat storage device of the present invention, the latent heat storage material 3 is disposed around the heat transfer cylindrical body 1. Specifically, in the latent heat storage device of the present invention in which the outer cylinder 4 is disposed around the heat transfer cylindrical body 1 (FIG. 1A) and in the latent heat storage device of the present invention in which the heat transfer cylindrical body 1 is installed in the outer cylinder container 4a with its upper part open (FIG. 1B), the latent heat storage material 3 is disposed in the given space between the heat transfer cylindrical body 1 and the outer cylinder 4 or the side portion of the outer cylinder container 4a. The above-described latent heat storage material 3 is not limited to be of a particular type as long as the material is a phase change material that can store the heat at high density by using the latent heat at the time of solid-liquid phase transformation, and examples of which include paraffin, sodium acetate trihydrate, erithritol, molten salts, and the like.

Moreover, in the latent heat storage device of the present invention, the filler which is immiscible with the latent heat storage material 3 and is in liquid form under the temperature condition at the time of heat exchange (at the time of heat release and at the time of heat storage) is preferably disposed between the outer peripheral surface of the heat transfer cylindrical body 1 and the latent heat storage material 3. The heat storage rate becomes even faster as a consequence of the existence of the above-described filler in liquid form between the outer peripheral surface of the heat transfer cylindrical body 1 and the latent heat storage material 3, or more specifically, the filler being put into a void between the outer peripheral surface of the heat transfer cylindrical body 1 and the solidified body of the latent heat storage material 3. Meanwhile, it is possible to suppress evaporation of moisture in the case of using a latent heat storage material based on a hydrate such as sodium acetate trihydrate as the latent heat storage material 3, or it is possible to suppress oxidation by air in the case of using a latent heat storage material based on a sugar or a sugar alcohol such as erithritol as the latent heat storage material 3.

In the meantime, the above-mentioned filler in liquid form preferably has a lower melting point, a lower density, a lower viscosity, a higher specific heat, and a lower vapor pressure than those of the latent heat storage material. Meanwhile, a boiling point and a flashing point of the above-mentioned filler in liquid form are preferably equal to or above an upper limit temperature at the time of heat exchange (at the time of heat release and at the time of heat storage). Examples of the above-described filler in liquid form include: various heat transfer oils and lubricating oils such as silicone oil, mineral oils, and chemical synthetic oils; and other oils such as paraffin.

In the meantime, the amount of the above-described filler in liquid form is not limited to a particular amount. However, this amount is preferably equal to or more than such an amount that can supplement a change in volume at the time of the solid-liquid phase transformation of the latent heat storage material, or more preferably equal to or above such an amount that can fill the void between the outer peripheral surface of the heat transfer cylindrical body 1 and the solidified body of the latent heat storage material 3 or a void within the solidified body of the latent heat storage material 3.

In the latent heat storage device of the present invention shown in FIG. 1A, blocking members 7a and 7b are attached to both ends of the heat transfer cylindrical body 1. The blocking members 7a and 7b are rotatably held to a heat medium outlet pipe 9b and a heat medium introduction pipe 9a by bearings (not shown), respectively. In this case, each inner fixed blade 6 that may be installed as appropriate is fixed to the heat medium outlet pipe 9b and the heat medium introduction pipe 9a (fixing means not shown). Meanwhile, in another aspect, the heat transfer cylindrical body 1 may be rotatably held to the blocking members 7a and 7b by bearings (not shown). In this case, the heat medium outlet pipe 9b and the heat medium introduction pipe 9a are fixed to the blocking members 7a and 7b, respectively. In the meantime, each inner fixed blade 6 that may be installed as appropriate may be fixed to the blocking members 7a and 7b or to the heat medium outlet pipe 9b and the heat medium introduction pipe 9a (fixing means not shown). Meanwhile, in still another aspect, the heat transfer cylindrical body 1 may be rotatably held to the blocking members 5a and 5b by bearings (not shown). In this case as well, the heat medium outlet pipe 9b and the heat medium introduction pipe 9a are fixed to the blocking members 7a and 7b, respectively. Meanwhile, each inner fixed blade 6 that may be installed as appropriate may be fixed to the blocking members 7a and 7b or to the heat medium outlet pipe 9b and the heat medium introduction pipe 9a (fixing means not shown). In the meantime, the heat transfer cylindrical body 1 and the blocking members 5a and 5b are sealed with a shield member (not shown). Moreover, rotary driving means (not shown) is connected to the heat transfer cylindrical body 1 through a belt (not shown) or the like and the heat transfer cylindrical body 1 is rotated by using the rotary driving means. Furthermore, in the latent heat storage device of the present invention shown in FIG. 1A, each outer fixed blade 2 is disposed in such a way as to be adjacent to or in slidable contact with the outer peripheral surface of the heat transfer cylindrical body 1. Though the method therefor is not limited to a particular method as long as the outer fixed blade 2 is disposed in the state of non-rotation, the outer fixed blade 2 is usually fixed to at least one of the outer cylinder 4 and the blocking members 5a and 5b. Meanwhile, the latent heat storage material 3 is disposed around the heat transfer cylindrical body 1 (preferably, the aforementioned filler in liquid form is further disposed between the outer peripheral surface of the heat transfer cylindrical body 1 and the latent heat storage material 3). The latent heat storage material 3 and the filler in liquid form are hermetically sealed by the outer cylinder 4 and the blocking members 5a and 5b.

On the other hand, in the latent heat storage device of the present invention shown in FIG. 1B, the blocking members 7a and 7b are attached to both ends of the heat transfer cylindrical body 1. The blocking members 7a and 7b are rotatably held to the heat medium outlet pipe 9b and the heat medium introduction pipe 9a by bearings (not shown), respectively. In this case, each inner fixed blade 6 that may be installed as appropriate is fixed to the heat medium outlet pipe 9b and the heat medium introduction pipe 9a (fixing means not shown). Moreover, the heat medium outlet pipe 9b is preferably held to an external non-rotational member (not shown) by using a jig or the like (not shown) in order to stabilize the heat transfer cylindrical body 1. Meanwhile, in another aspect, the heat transfer cylindrical body 1 may be rotatably held to the blocking members 7a and 7b by bearings (not shown). In this case, the heat medium outlet pipe 9b and the heat medium introduction pipe 9a are fixed to the blocking members 7a and 7b, respectively. Meanwhile, each inner fixed blade 6 that may be installed as appropriate may be fixed to the blocking members 7a and 7b or to the heat medium outlet pipe 9b and the heat medium introduction pipe 9a (fixing means not shown). Moreover, at least one of the blocking member 7a at an upper part and the heat medium outlet pipe 9b is preferably held to the external non-rotational member (not shown) by using a jig or the like (not shown) in order to stabilize the heat transfer cylindrical body 1. In addition, in still another aspect, a lower part of the heat transfer cylindrical body 1 may be rotatably held to a bottom part of the outer cylinder container 4a with its upper part open by a bearing. In this case as well, the heat medium outlet pipe 9b and the heat medium introduction pipe 9a are fixed to the blocking members 7a and 7b, respectively. In the meantime, each inner fixed blade 6 that may be installed as appropriate may be fixed to the blocking members 7a and 7b or to the heat medium outlet pipe 9b and the heat medium introduction pipe 9a (fixing means not shown). Moreover, at least one of the blocking member 7a at the upper part and the heat medium outlet pipe 9b is preferably held rotatably to the external non-rotational member (not shown) by using a jig or the like (not shown) in order to stabilize the heat transfer cylindrical body 1. Furthermore, the heat transfer cylindrical body 1 and the bottom part of the outer cylinder container 4a are sealed with a shield member (not shown). Meanwhile, the blocking member 7a at the upper part is preferably held to the external non-rotational member (not shown) by using the jig or the like (not shown) in order to stabilize the heat transfer cylindrical body 1. Moreover, the rotary driving means (not shown) is connected to the heat transfer cylindrical body 1 through the belt (not shown) or the like and the heat transfer cylindrical body 1 is rotated by using the rotary driving means. Meanwhile, in the latent heat storage device of the present invention shown in FIG. 1B, each outer fixed blade 2 is disposed in such a way as to be adjacent to or in slidable contact with the outer peripheral surface of the heat transfer cylindrical body 1. Though the method therefor is not limited to a particular method as long as the outer fixed blade 2 is disposed in the state of non-rotation, the outer fixed blade 2 may be fixed to the external non-rotational member (not shown) by using the jig or the like (not shown) or may be fixed to the bottom part of the outer cylinder container 4a. In addition, the latent heat storage material 3 is disposed around the heat transfer cylindrical body 1 (preferably, the aforementioned filler in liquid form is further disposed between the outer peripheral surface of the heat transfer cylindrical body 1 and the latent heat storage material 3). The latent heat storage material 3 and the filler in liquid form are housed in the outer cylinder container 4a. The above-described outer cylinder container 4a is not limited to a particular container as long as it is possible to hold the blocking member 7b attached to the heat transfer cylindrical body 1 at the bottom part of the container and to house the latent heat storage material 3 and the aforementioned filler in liquid form, and may be a small-sized container (such as a dedicated heat storage container as large as an 18-liter can, a drum, and the like) or a large-sized tank (such as a dedicated heat storage tank as large as a transport container and the like). Particularly, in the case of using the large-sized tank as the outer cylinder container 4a, it is possible to install multiple heat transfer cylindrical bodies 1 in the single tank.

Furthermore, in each of the latent heat storage devices of the present invention shown in FIG. 1A and FIG. 1B, the latent heat storage material 3 is disposed (put) in the space between the heat transfer cylindrical body 1 and the outer cylinder 4 or the side portion of the outer cylinder container 4a. In the meantime, it is preferable to dispose the above-mentioned filler in liquid form between the outer peripheral surface of the heat transfer cylindrical body 1 and the latent heat storage material 3, or specifically, in the void between the outer peripheral surface of the heat transfer cylindrical body 1 and the latent heat storage material 3. When a cold medium (such as cold water) is flowed as the heat medium 8 in the heat transfer cylindrical body 1 of the latent heat storage device described above, heat transfer from the latent heat storage material 3 to the cold medium takes place. Hence, the cold medium is heated while the latent heat storage material 3 solidifies and adheres to the outer peripheral surface of the heat transfer cylindrical body 1. In this instance, by rotating the heat transfer cylindrical body 1, the solidified body of the latent heat storage material 3 adhering to the outer peripheral surface of the heat transfer cylindrical body 1 is scraped off the outer peripheral surface of the heat transfer cylindrical body 1 by the outer fixed blades 2, and either the latent heat storage material 3 in liquid form or the latent heat storage material 3 in the form of a slurry in which the scraped solidified body is mixed with the latent heat storage material 3 in liquid form comes into direct contact with an outer peripheral portion of the heat transfer cylindrical body 1. Accordingly, heat transfer resistance in the vicinity of the outer peripheral surface of the heat transfer cylindrical body 1 is reduced as compared to the case where the solidified body of the latent heat storage material 3 keeps adhering, whereby the heat release rate becomes faster. Moreover, the entire latent heat storage material 3 comes to sequential contact with the heat transfer cylindrical body 1 as a consequence of agitation of the latent heat storage material 3. This makes it possible to extract the entire heat held by the latent heat storage material 3 whereby the amount of heat release is increased. On the other hand, when a hot medium (such as heated water) is flowed as the heat medium 8 in the heat transfer cylindrical body 1, heat transfer from the hot medium to the latent heat storage material 3 takes place. Hence, the hot medium is cooled and the solidified latent heat storage material 3 liquefies. The above-mentioned fusion of the latent heat storage material 3 progresses in the vicinity of the outer peripheral surface of the heat transfer cylindrical body 1. Here, if the above-mentioned filler in liquid form exists between the outer peripheral surface of the heat transfer cylindrical body 1 and the latent heat storage material 3, or specifically, in the void between the outer peripheral surface of the heat transfer cylindrical body 1 and the latent heat storage material 3, the heat transfer from the hot medium to the latent heat storage material 3 is more likely to take place and the solidified latent heat storage material 3 is more likely to fuse, whereby the heat storage rate is increased. Meanwhile, by rotating the heat transfer cylindrical body 1, the latent heat storage material 3 in liquid form in the vicinity of the outer peripheral surface of the heat transfer cylindrical body 1 circulates and transports the heat to the solidified body of the latent heat storage material 3 by way of convection. Accordingly, the heat storage rate is increased as compared to the case where the latent heat storage material 3 in liquid form stays in the vicinity of the outer peripheral surface of the heat transfer cylindrical body 1. Moreover, this circulation collides with one of the outer fixed blades 2 to create the flow in the direction perpendicular to the outer peripheral surface of the heat transfer cylindrical body, whereby the heat storage rate is further increased. Meanwhile, due to this flow, the latent heat storage material 3 in liquid form is uniformly mixed with the solidified body of the latent heat storage material 3 in the vicinity of an inner peripheral surface of either the outer cylinder 4 or the side portion of the outer cylinder container 4a. Thus, the heat storage rate becomes even faster.

Figure 3A:
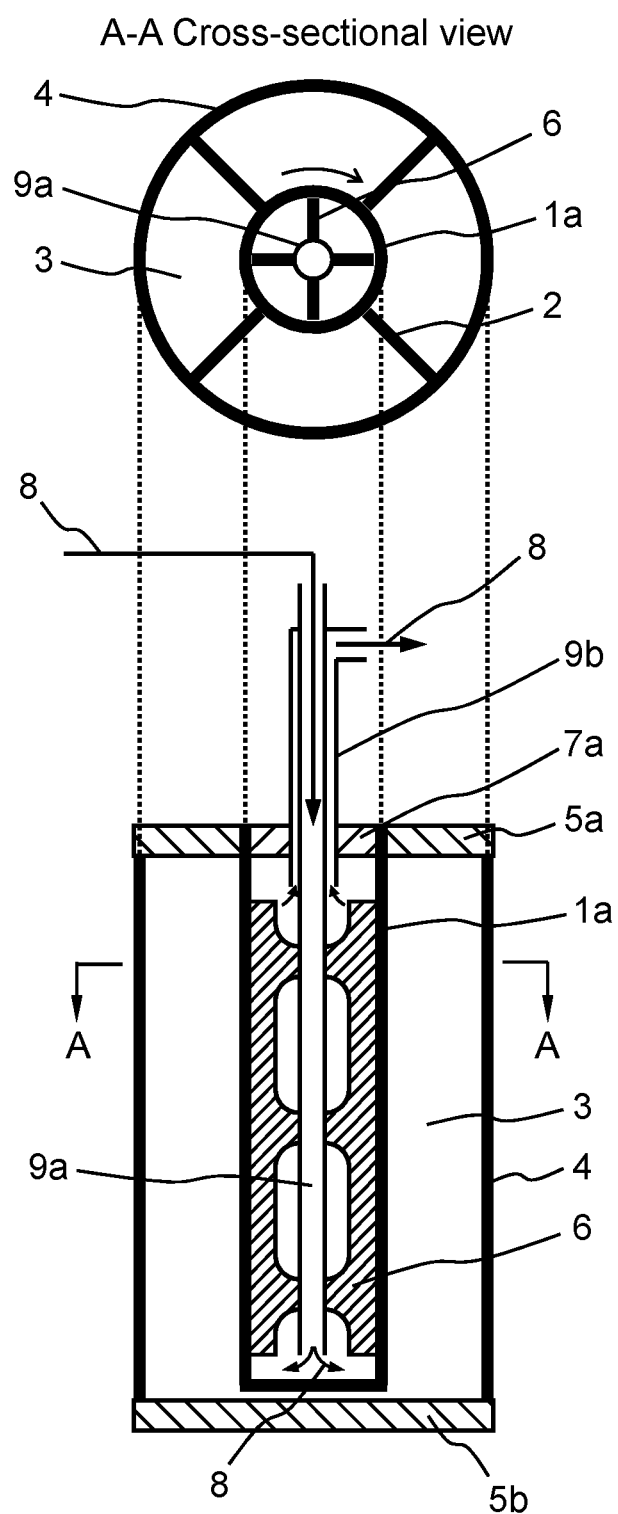
FIG. 3A is a cross-sectional view showing another embodiment of the latent heat storage device of the present invention.
Figure 3B:
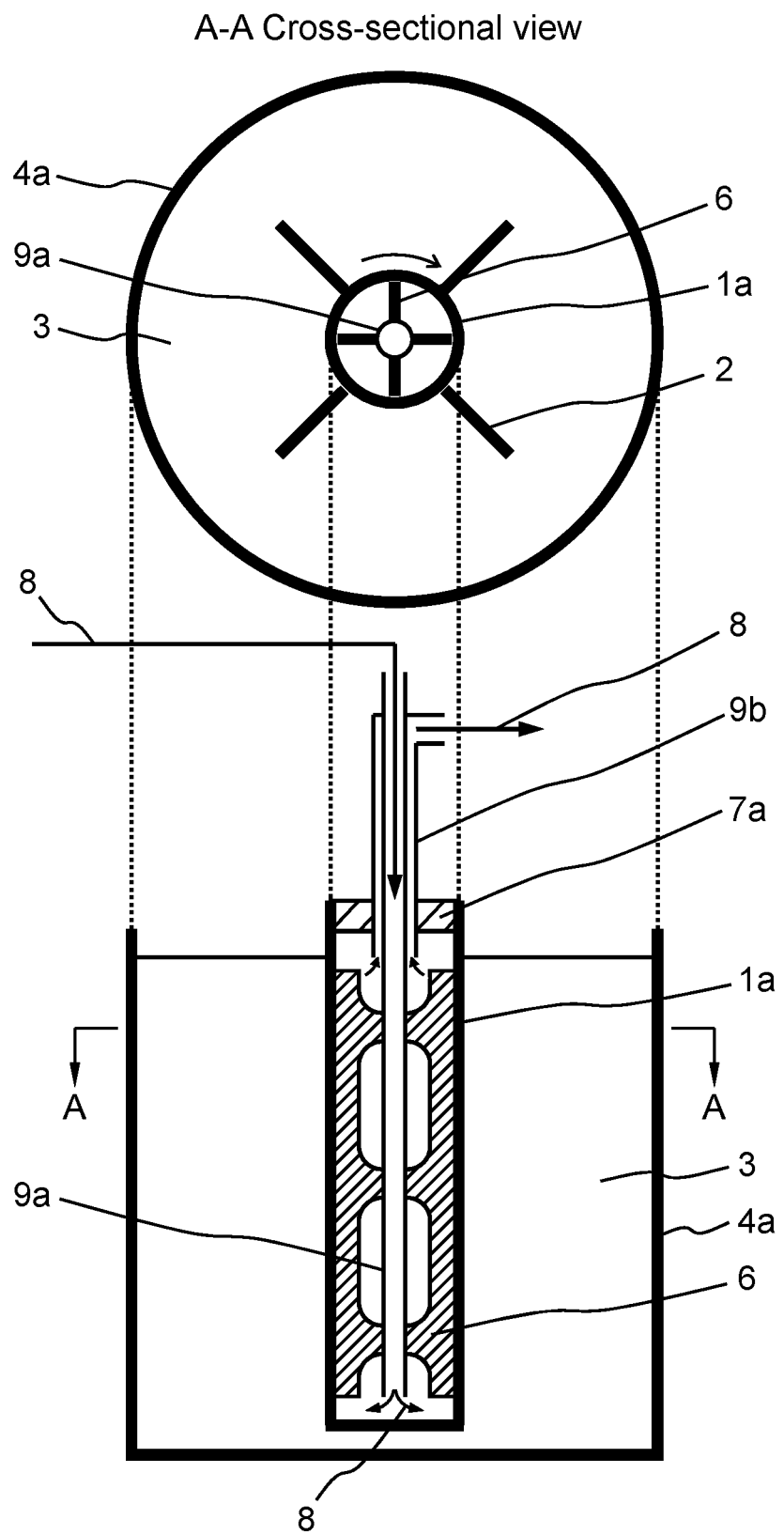
FIG. 3B is a cross-sectional view showing another embodiment of the latent heat storage device of the present invention.

A preferred embodiment of the latent heat storage device of the present invention has been described above. However, the latent heat storage device of the present invention is not limited to the above-described embodiment. For example, as shown in FIG. 3A and FIG. 3B, a heat transfer container 1a in a cylindrical shape with an end portion on one side closed can also be used as the heat transfer cylindrical body. Inside the cylindrical heat transfer container 1a, the heat medium introduction pipe 9a is disposed in an area from the other end portion (an open end portion) to the vicinity of the end portion that is closed (a closed end portion), so that the heat medium 8 can be introduced from the open end portion of the cylindrical heat transfer container 1a into the vicinity of the closed end portion thereof through the heat medium introduction pipe 9a. Then, the heat medium 8 introduced into the vicinity of the closed end portion flows outside of the heat medium introduction pipe 9a in the cylindrical heat transfer container 1a toward the open end portion, then performs heat exchange with the latent heat storage material 3, and is discharged through the heat medium outlet pipe 9b.

In the latent heat storage device of the present invention shown in FIG. 3A, the blocking member 7a is attached to the open end portion of the heat transfer cylindrical body 1, and the blocking member 7a is rotatably held to the heat medium outlet pipe 9b by a bearing (not shown). In this case, each inner fixed blade 6 that may be installed as appropriate is fixed to the heat medium outlet pipe 9b and the heat medium introduction pipe 9a (fixing means not shown). Meanwhile, in another aspect, the heat transfer cylindrical body 1 may be rotatably held to the blocking member 7a by a bearing (not shown). In this case, the heat medium outlet pipe 9b and the heat medium introduction pipe 9a are fixed to the blocking member 7a. In the meantime, each inner fixed blade 6 that may be installed as appropriate may be fixed to the blocking member 7a or to the heat medium outlet pipe 9b and the heat medium introduction pipe 9a (fixing means not shown). Moreover, in still another aspect, the heat transfer cylindrical body 1 may be rotatably held to the blocking member 5a by a bearing (not shown). In this case as well, the heat medium outlet pipe 9b and the heat medium introduction pipe 9a are fixed to the blocking member 7a. Meanwhile, each inner fixed blade 6 that may be installed as appropriate may be fixed to the blocking member 7a or to the heat medium outlet pipe 9b and the heat medium introduction pipe 9a (fixing means not shown). In the meantime, the heat transfer cylindrical body 1 and the blocking member 5a are sealed with a shield member (not shown). Moreover, rotary driving means (not shown) is connected to the heat transfer cylindrical body 1 through a belt (not shown) or the like and the heat transfer cylindrical body 1 is rotated by using the rotary driving means. Furthermore, in the latent heat storage device of the present invention shown in FIG. 3A, each outer fixed blade 2 is disposed in such a way as to be adjacent to or in slidable contact with the outer peripheral surface of the heat transfer cylindrical body 1. Though the method therefor is not limited to a particular method as long as the outer fixed blade 2 is disposed in the state of non-rotation, the outer fixed blade 2 is usually fixed to at least one of the outer cylinder 4 and the blocking members 5a and 5b. Meanwhile, the latent heat storage material 3 is disposed around the heat transfer cylindrical body (preferably, the aforementioned filler in liquid form is further disposed between the outer peripheral surface of the heat transfer cylindrical body 1 and the latent heat storage material 3). The latent heat storage material 3 and the aforementioned filler in liquid form are hermetically sealed by the outer cylinder 4 and the blocking members 5a and 5b.

On the other hand, in the latent heat storage device of the present invention shown in FIG. 3B, the blocking member 7a is attached to the open end portion of the heat transfer cylindrical body 1, and the blocking member 7a is rotatably held to the heat medium outlet pipe 9b by a bearing (not shown). In this case, the heat medium outlet pipe 9b is usually held to an external non-rotational member (not shown) by using a jig or the like (not shown). In the meantime, each inner fixed blade 6 that may be installed as appropriate is fixed to the heat medium outlet pipe 9b and the heat medium introduction pipe 9a (fixing means not shown). Meanwhile, in another aspect, the heat transfer cylindrical body 1 may be rotatably held to the blocking member 7a by a bearing (not shown). In this case, at least one of the blocking member 7a and the heat medium outlet pipe 9b is fixed to the external non-rotational member (not shown) by using the jig or the like (not shown). Moreover, the heat medium outlet pipe 9b and the heat medium introduction pipe 9a are fixed to the blocking member 7a. In the meantime, each inner fixed blade 6 that may be installed as appropriate may be fixed to the blocking member 7a or to the heat medium outlet pipe 9b and the heat medium introduction pipe 9a (fixing means not shown). Moreover, rotary driving means (not shown) is connected to the heat transfer cylindrical body 1 through a belt (not shown) or the like and the heat transfer cylindrical body 1 is rotated by using the rotary driving means. Furthermore, in the latent heat storage device of the present invention shown in FIG. 3B, each outer fixed blade 2 is disposed in such a way as to be adjacent to or in slidable contact with the outer peripheral surface of the heat transfer cylindrical body 1. Though the method therefor is not limited to a particular method as long as the outer fixed blade 2 is disposed in the state of non-rotation, the outer fixed blade 2 may be fixed to the external non-rotational member (not shown) by using the jig or the like (not shown) or may be fixed to the bottom part of the outer cylinder container 4a. In addition, in the latent heat storage device of the present invention shown in FIG. 3B, the heat transfer cylindrical body 1 and the latent heat storage material 3 disposed therearound (and preferably the aforementioned filler in liquid form further disposed between the outer peripheral surface of the heat transfer cylindrical body 1 and the latent heat storage material 3) are housed in the outer cylinder container 4a with its upper part open. The above-described outer cylinder container 4a is not limited to a particular container and may be a small-sized container (such as a heat storage container as large as an 18-liter can, a drum, and the like) or a large-sized tank (such as a heat storage tank as large as a transport container and the like). In the above-described latent heat storage device, the blocking member 7a attaching the heat transfer cylindrical body 1 does not have to be fixed to the outer cylinder container 4a. Accordingly, it is possible to install the heat transfer cylindrical body 1 at a desired position of the outer cylinder container 4a that houses the latent heat storage material 3 and the above-mentioned filler in liquid form. Meanwhile, it is possible to install plurality of heat transfer cylindrical bodies 1 in the case of using the large-sized tank as the outer cylinder container 4a.

In each of the latent heat storage devices of the present invention shown in FIG. 1A and FIG. 1B, when the solidified body of the latent heat storage material 3 that is scraped off is deposited on a seal member at the lower blocking member 5b or at the bottom part of the outer cylinder container 4a, the seal member may be broken because a load attributed to the rotation of the heat transfer cylindrical body 1 may be applied to the seal member, and it is therefore necessary to shorten an interval of maintenance and inspection (a period before the next maintenance and inspection). On the other hand, in the latent heat storage devices of the present invention shown in FIG. 3A and FIG. 3B, there is no seal member at the lower blocking member 5b or at the bottom part of the outer cylinder container 4a. Accordingly, there is no trouble like breakage of the seal member even if the solidified body of the latent heat storage material 3 that is scraped off is deposited on the lower blocking member 5b or on the bottom part of the outer cylinder container 4a. Thus, it is possible to prolong the interval of maintenance and inspection (the period before the next maintenance and inspection).

Meanwhile, in each of the latent heat storage devices of the present invention shown in FIG. 3A and FIG. 3B, the single blocking member 7a that attaches the cylindrical heat transfer cylindrical body 1a is just rotatably held to the external non-rotational member (not shown) by using any of the blocking member 5a and the jig or the like (not shown), and does not have to be held at the lower blocking member 5b or the bottom part of the outer cylinder container 4a. Accordingly, these components can be assembled more easily than the latent heat storage devices of the present invention shown in FIG. 1A and FIG. 1B. In addition, the latent heat storage devices of the present invention shown in FIG. 3A and FIG. 3B require a smaller number of components such as the seal member and the bearings as compared to the latent heat storage devices of the present invention shown in FIG. 1A and FIG. 1B, and are also excellent from an economical point of view.

EXAMPLES

The present invention will be more specifically described below based on examples and comparative examples. However, the present invention will not be limited to the following examples.

Example 1

A heat release test was conducted by using the latent heat storage device shown in FIG. 1A. A copper pipe (inside diameter 47 mm) was used as the heat transfer cylindrical body 1 and a cylinder made of acrylic resin (inside diameter 150 mm) was used as the outer cylinder 4. Four inner fixed blades 6 (made of Teflon (registered trademark), width 14 mm) were arranged in a cross shape and attached to the inside of the heat transfer cylindrical body 1 while one outer fixed blade 2 (made of Teflon (registered trademark), width 10 mm) was attached to the outside of the heat transfer cylindrical body 1. Note that although the two outer fixed blades 2 are attached in FIG. 1A, the single outer fixed blade 2 was attached in this example. A space (volume 1.6 L) between the heat transfer cylindrical body 1 and the outer cylinder 4 was filled with 1000 g of sodium acetate trihydrate (melting point 58° C.) at a temperature of 65° C. as the latent heat storage material 3. Water at a temperature of 40° C. was flowed as the heat medium 8 in the heat transfer cylindrical body 1 at a flow rate of 1.0 L/min and the heat transfer cylindrical body 1 was rotated at 100 rpm. When a state of the latent heat storage material 3 inside the cylinder made of acrylic resin was observed, the solidified body of the latent heat storage material 3 was generated in the vicinity of the outer peripheral surface of the copper pipe due to the heat release, and began to adhere to the outer peripheral surface of the copper pipe. Nonetheless, the solidified body was scraped off by the outer fixed blade 2 and mixed with a liquid portion of the latent heat storage material 3 and formed into a slurry. As the heat release test was continued thereafter, the state of the slurry was maintained for about 350 seconds.

Figure 4:
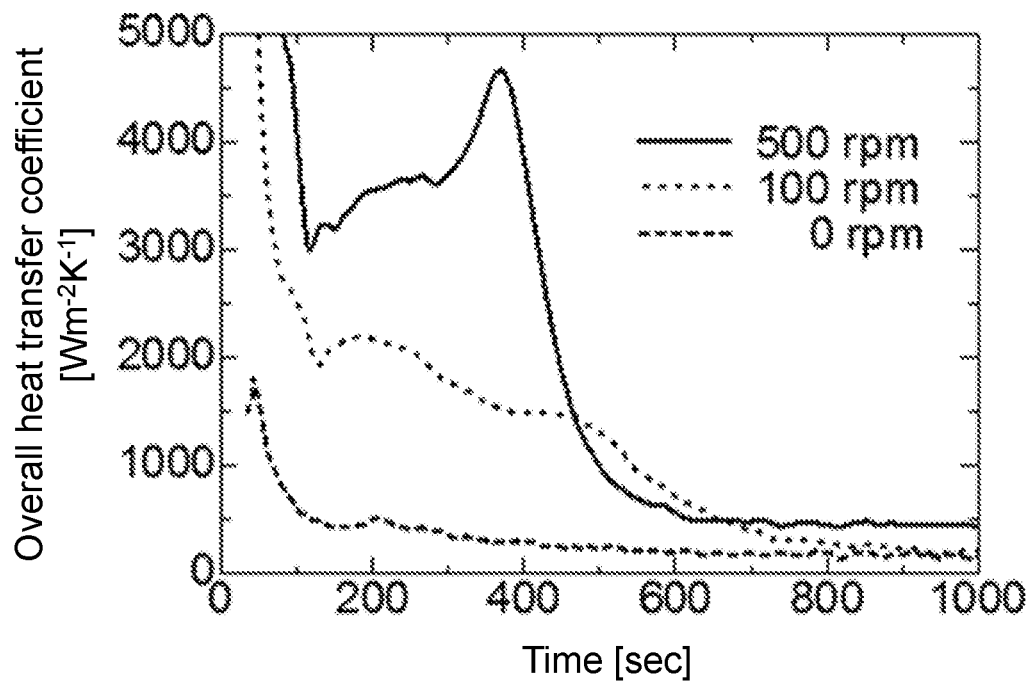
FIG. 4 is a graph showing changes in overall heat transfer coefficient over time in heat release tests conducted in Examples 1, 2, and Comparative Example 1.
Figure 5:
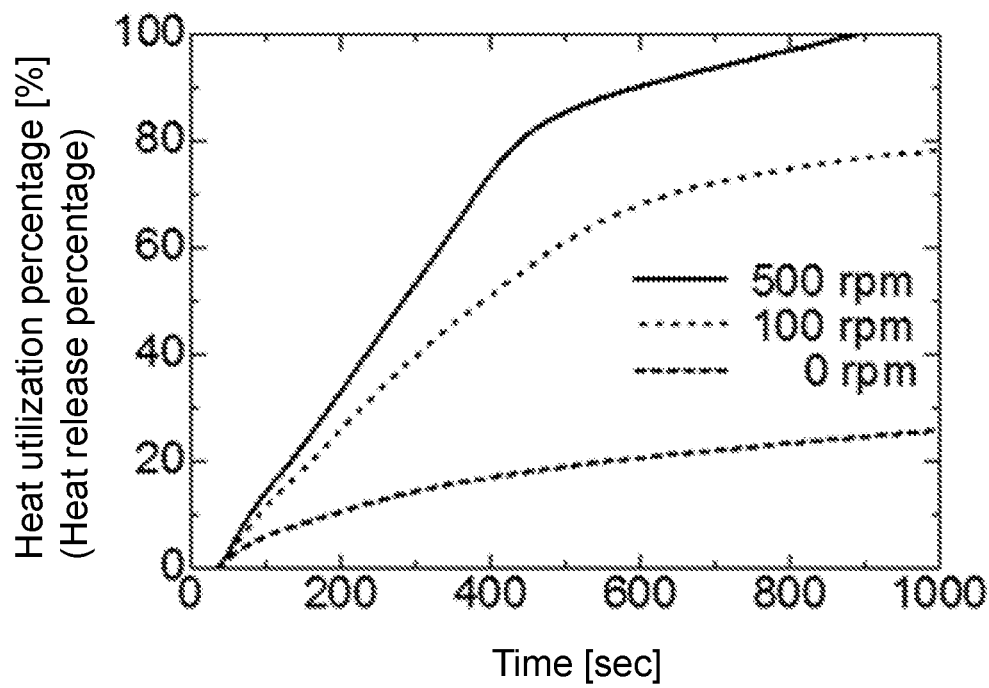
FIG. 5 is a graph showing changes in heat utilization percentage (heat release percentage) over time in the heat release tests conducted in Examples 1, 2, and Comparative Example 1.

An overall heat transfer coefficient of the latent heat storage device during this period was measured, which turned out to be high values as shown in FIG. 4. In the meantime, an amount of heat transferred from the latent heat storage material to the heat medium (the water) was calculated and a heat utilization percentage (a heat release percentage) was determined by dividing the amount of heat by a sum of latent heat and sensible heat of the latent heat storage material. Results are shown in FIG. 5.

Example 2

A heat release test was conducted in the same manner as in Example 1 except that the number of revolutions of the heat transfer cylindrical body 1 was changed to 500 rpm. When the state of the latent heat storage material 3 inside the cylinder made of acrylic resin was observed, the solidified body of the latent heat storage material 3 was generated in the vicinity of the outer peripheral surface of the copper pipe due to the heat release, and began to adhere to the outer peripheral surface of the copper pipe. Nonetheless, the solidified body was scraped off by the outer fixed blade 2 and the latent heat storage material 3 was formed into a slurry. As the heat release test was continued thereafter, the state of the slurry was maintained for about 220 seconds. The overall heat transfer coefficient of the latent heat storage device during this period was measured, which turned out to be high values as shown in FIG. 4. In the meantime, the heat utilization percentage (the heat release percentage) was determined in the same manner as in Example 1. Results are shown in FIG. 5.

Comparative Example 1

A heat release test was conducted in the same manner as in Example 1 except that the number of revolutions of the heat transfer cylindrical body 1 was changed to 0 rpm. When the state of the latent heat storage material 3 inside the cylinder made of acrylic resin was observed, the solidified body of the latent heat storage material 3 was generated in the vicinity of the outer peripheral surface of the copper pipe due to the heat release, and began to adhere to the outer peripheral surface of the copper pipe. As the heat release test was continued thereafter, the latent heat storage material 3 was gradually solidified from the copper pipe side. The heat utilization percentage (the heat release percentage) during this period was determined in the same manner as in Example 1, which turned out to be extremely low that remained at 67% even after a lapse of two hours. In the meantime, the overall heat transfer coefficient during this period was determined. Results are shown in FIG. 4.

As apparent from the results shown in FIG. 4, the overall heat transfer coefficient after a lapse of 300 seconds was 300 W/($m^2$·K) in the case of no rotation (0 rpm), but was 1800 W/($m^2$·K) at 100 rpm and was 3700 W/($m^2$·K) at 500 rpm.

Accordingly, it turned out that the overall heat transfer coefficient was increased by rotating the heat transfer cylindrical body and scraping off the solidified body of the latent heat storage material adhering to the outer peripheral surface thereof. Meanwhile, when the heat transfer cylindrical body was rotated, it turned out that the overall heat transfer coefficient was maintained at a high value until a lapse of a certain period of time but suddenly dropped thereafter. This is thought to be because the latent heat storage material was completely solidified by the heat release and the release of the stored latent heat finished accordingly. Moreover, it turned out that the period of maintenance of the high overall heat transfer coefficient became shorter as the speed of rotation of the heat transfer cylindrical body became higher. This is thought to be because the heat release rate from the latent heat storage material becomes higher as the speed of rotation of the heat transfer cylindrical body is higher, whereby the time necessary for releasing the sensible heat as well as the latent heat stored in the latent heat storage material becomes shorter.

As apparent from the results shown in FIG. 5, it turned out that the heat utilization percentage (the heat release percentage) was increased with the lapse of time irrespective of the presence or absence of the rotation of the heat transfer cylindrical body. Moreover, it also turned out that a speed of increase in heat utilization percentage (heat release percentage) became faster as the speed of rotation of the heat transfer cylindrical body became faster. Furthermore, it turned out to be possible to extract heat energy held by the latent heat storage material in a short time by rotating the heat transfer cylindrical body and scraping off the solidified body of the latent heat storage material adhering to the outer peripheral surface thereof.

Figure 6:
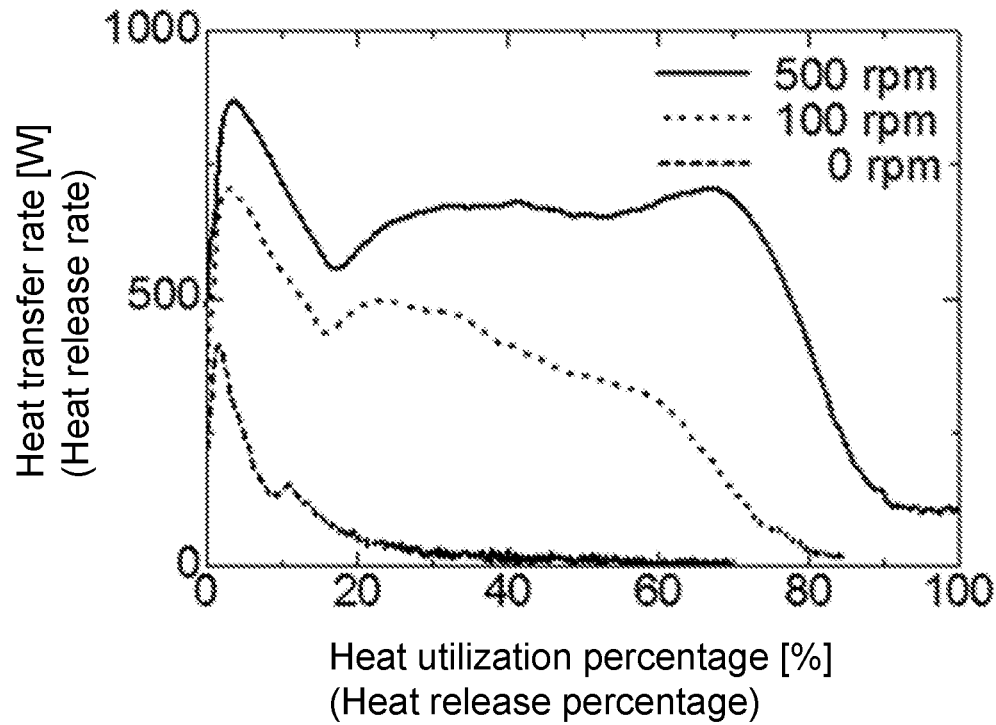
FIG. 6 is a graph showing a relation between the heat utilization percentage (the heat release percentage) and a heat transfer rate (a heat release rate) in the heat release tests conducted in Examples 1, 2, and Comparative Example 1.
Figure 7:
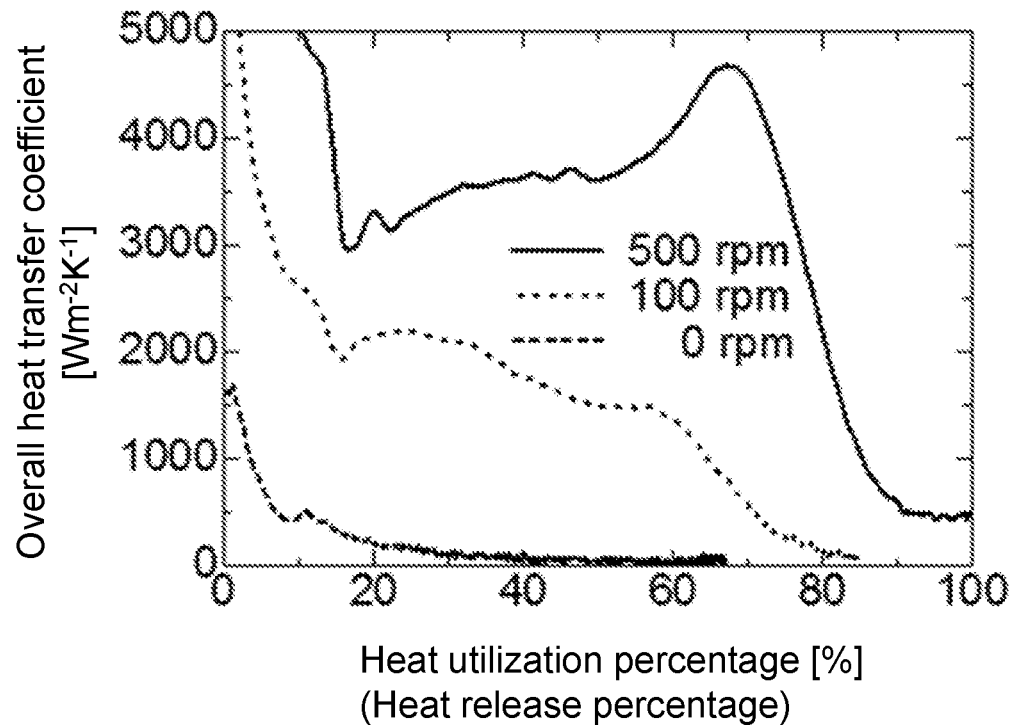
FIG. 7 is a graph showing a relation between the heat utilization percentage (the heat release percentage) and the overall heat transfer coefficient in the heat release tests conducted in Examples 1, 2, and Comparative Example 1.

Relations among the heat utilization percentage (the heat release percentage), the heat transfer rate (the heat release rate), and the overall heat transfer coefficient were determined based on the results shown in FIG. 4 and FIG. 5. Results are shown in FIG. 6 and FIG. 7. As apparent from the results shown in FIG. 6 and FIG. 7, it turned out that even when the heat utilization percentage (the heat release percentage) became higher (in other words, even when the heat energy held by the latent heat storage material was reduced), the heat transfer rate (the heat release rate) and the overall heat transfer coefficient were high and the high heat transfer performance was thus maintained by rotating the heat transfer cylindrical body and scraping off the solidified body of the latent heat storage material adhering to the outer peripheral surface thereof. On the other hand, a high heat transfer performance was not available in the case of no rotation because the heat transfer rate (the heat release rate) and the overall heat transfer coefficient were low even when the heat utilization percentage (the heat release percentage) was low (in other words, even when a lot of the heat energy remains in the latent heat storage material). From this result, it turned out that the latent heat storage device of the present invention could utilize a major part of the heat energy held by the latent heat storage material at a practical heat supply speed. On the other hand, it turned that a ratio of the heat energy held by the latent heat storage material which could be used at a practical heat supply speed was little in the case of no rotation of the heat transfer cylindrical body, that is, in the conventional latent heat storage device.

Meanwhile, in the case of the heat utilization percentage (the heat release percentage) at 50%, for example, the heat transfer rate (the heat release rate) was 9 W and the overall heat transfer coefficient was 41 W/(m²·K) in the case of no rotation (0 rpm). On the other hand, the heat transfer rate (the heat release rate) was 399 W (43 times as large as that in the case of no rotation) and the overall heat transfer coefficient was 1696 W/(m²·K) (42 times as large as that in the case of no rotation) at 100 rpm, while the heat transfer rate (the heat release rate) was 647 W (70 times as large as that in the case of no rotation) and the overall heat transfer coefficient was 3531 W/(m²·K) (87 times as large as that in the case of no rotation) at 500 rpm. Thus, it turned out that the heat transfer rate (the heat release rate) and the overall heat transfer coefficient were significantly increased by rotating the heat transfer cylindrical body and scraping off the solidified body of the latent heat storage material adhering to the outer peripheral surface thereof.

Furthermore, in the case of 500 rpm, the heat transfer rate (the heat release rate) was constant when the heat utilization percentage (the heat release percentage) was in a range from 25% to 70%. On the other hand, in the case of 100 rpm, the heat transfer rate (the heat release rate) was higher than that in the case of no rotation (0 rpm) but was gradually reduced. This is presumably because a liquid phase percentage in the latent heat storage material is decreased and a solid phase percentage therein is increased along with an increase in heat utilization percentage (heat release percentage), whereby a thickness of the solidified body to be formed on the outer peripheral surface of the heat transfer cylindrical body per unit amount of heat transfer is increased and the solidified body grows on the outer peripheral surface of the heat transfer cylindrical body into such a thickness that brings about significant heat transfer resistance before being scraped off by the fixed blade in the case of low revolutions (100 rpm), or because the state of mixture of the latent heat storage material in the forms of the liquid and the slurry is deteriorated to bring about significant temperature distribution in the latent heat storage material, thereby gradually reducing the heat transfer rate (the heat release rate). Accordingly, in the case where the number of revolutions of the heat transfer cylindrical body is determined in advance, it is important to select the number of the fixed blades in conformity to the number of revolutions so as to reliably scrape off the solidified body adhering to the outer peripheral surface of the heat transfer cylindrical body and to ameliorate the state of mixture of the latent heat storage material in the forms of the liquid and the slurry.

Meanwhile, as shown in FIG. 4, FIG. 6, and FIG. 7, the heat transfer rate (the heat release rate) and the overall heat transfer coefficient during the period in which the solidification of the latent heat storage material was in progress in the heat release operation turned out to be increased along with the increase in the number of revolutions of the heat transfer cylindrical body. In the meantime, under conditions where a supply speed and a supply temperature of the heat medium are constant, the heat transfer rate (the heat release rate) corresponds one-to-one to an exit temperature of the heat medium. This indicates that the heat medium that flows out of the latent heat storage device can be controlled at a constant temperature by adjusting the number of revolutions of the heat transfer cylindrical body.

Example 3

A heat storage test was conducted by using the latent heat storage device shown in FIG. 1A. A copper pipe (outside diameter 55 mm, thickness 2 mm, height 334 mm) was used as the heat transfer cylindrical body 1 and a cylinder made of acrylic resin (inside diameter 110 mm, height 228 mm) was used as the outer cylinder 4. Four inner fixed blades 6 (made of Teflon (registered trademark), width 14 mm) were arranged in a cross shape and attached to the inside of the heat transfer cylindrical body 1 while one outer fixed blade 2 (made of Teflon (registered trademark), width 10 mm) was attached to the outside of the heat transfer cylindrical body 1. Note that although the two outer fixed blades 2 are attached in FIG. 1A, the single outer fixed blade 2 was attached in this example.

First, a space (volume 1.6 L) between the heat transfer cylindrical body 1 and the outer cylinder 4 was filled with 1000 g of sodium acetate trihydrate (melting point 58° C.) as the latent heat storage material 3. Moreover, 36 g of sodium phosphate dodecahydrate was added as a supercooling inhibitor. Next, heated water at a temperature of 70° C. was flowed as the heat medium 8 in the heat transfer cylindrical body 1 to fuse the latent heat storage material 3, and the temperature of the latent heat storage material 3 was increased to 65° C. Thereafter, water at a temperature of 40° C. was flowed as the heat medium 8 in the heat transfer cylindrical body 1 at a flow rate of 1.0 L/min while rotating the heat transfer cylindrical body 1 at 500 rpm, and the latent heat storage material 3 was thus solidified. The solidified latent heat storage material 3 had a temperature of 40° C. and a height of a phase formed from the solidified body of the latent heat storage material 3 was 8.4 cm.

Figure 8:
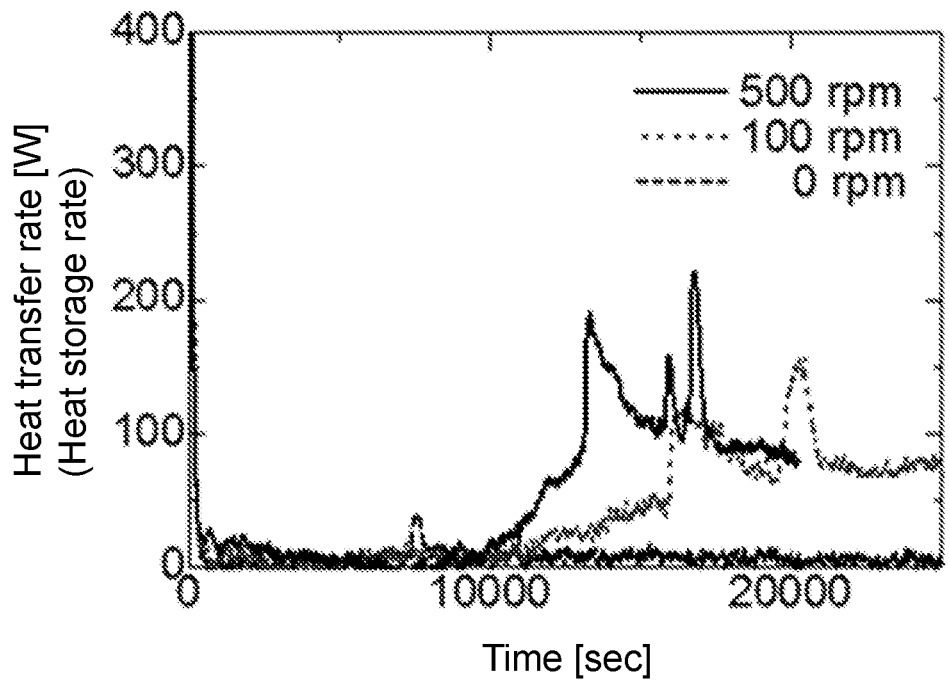
FIG. 8 is a graph showing changes in heat storage rate over time in heat storage tests conducted in Examples 3, 4, and Comparative Example 2.

Next, a heat storage test was conducted by flowing heated water at a temperature of 70° C. as the heat medium 8 in the heat transfer cylindrical body 1 at a flow rate of 1.0 L/min while rotating the heat transfer cylindrical body 1 at 500 rpm. An amount of heat storage was determined by measuring the temperature of the latent heat storage material 3 during this period, and a heat storage rate was further calculated. FIG. 8 shows a change in heat storage rate over time.

Example 4

A heat storage test was conducted in the same manner as in Example 3 except that the number of revolutions of the heat transfer cylindrical body 1 was changed to 100 rpm. An amount of heat storage was determined by measuring the temperature of the latent heat storage material 3 during this period, and a heat storage rate was further calculated. FIG. 8 shows a change in heat storage rate over time.

Comparative Example 2

A heat storage test was conducted in the same manner as in Example 3 except that the number of revolutions of the heat transfer cylindrical body 1 was changed to 0 rpm. An amount of heat storage was determined by measuring the temperature of the latent heat storage material 3 during this period, and a heat storage rate was further calculated. FIG. 8 shows a change in heat storage rate over time.

As apparent from the results shown in FIG. 8, the heat storage rate was very small in a first half of each heat storage test irrespective of the presence or absence of rotation of the heat transfer cylindrical body. This is thought to be due to the following reasons. Specifically, the latent heat storage material contracted in the course of solidification at the time of heat release whereby the void was created between the outer peripheral surface of the heat transfer cylindrical body and the solidified body of the latent heat storage material. This void blocked the heat transfer at the start of the heat storage and the heat from the heat transfer cylindrical body was not sufficiently transferred to the solidified body of the latent heat storage material in the vicinity of the outer peripheral surface of the heat transfer cylindrical body.

Hence, the fusion of the solidified body of the latent heat storage material was delayed.

Meanwhile, in the case of no rotation (0 rpm) of the heat transfer cylindrical body, the heat storage rate was not increased even in a second half of the heat storage test. This is thought to be due to the following reasons. Specifically, in the case of no rotation of the heat transfer cylindrical body, the fused latent heat storage material in the vicinity of the outer peripheral surface of the heat transfer cylindrical body convected naturally. Nonetheless, the heat transfer owing to the natural convection had a low rate and that was why the heat transfer rate from the heat transfer cylindrical body to the solidified body of the latent heat storage material was not increased.

On the other hand, when the heat transfer cylindrical body was rotated, the heat storage rate was increased in the second half of the heat storage test. This is thought to be due to the following reasons. Specifically, the fused latent heat storage material in the vicinity of the outer peripheral surface of the heat transfer cylindrical body was forced to convect by the rotation of the heat transfer cylindrical body, and this circulation collided with the outer fixed blade and was changed into a flow in the direction of the outer cylinder. Moreover, the flow was further changed into a flow along an inner wall of the outer cylinder, and thus caused the fusion of the solidified body of the latent heat storage material in the vicinity of the inner wall of the outer cylinder as well as in the vicinity of the outer fixed blade.

Example 5

The solidified body of the latent heat storage material 3 was formed in the same manner as in Example 3 except that 68 g of silicone oil ("ShinEtsu Silicone KF-10CS" manufactured by ShinEtsu Chemical Co., Ltd., kinetic viscosity (25° C.): 10 CS) was further added as the filler in liquid form into the space (volume 1.6 L) between the heat transfer cylindrical body 1 and the outer cylinder 4. The solidified body of the latent heat storage material 3 had a temperature of 40° C. and a height of a phase formed from the solidified body of the latent heat storage material 3 was 8.4 cm. Meanwhile, the silicone oil was put into the void between the outer peripheral surface of the heat transfer cylindrical body 1 and the solidified body of the latent heat storage material 3, and a height of a phase thereof was 1.0 cm.

Figure 9:
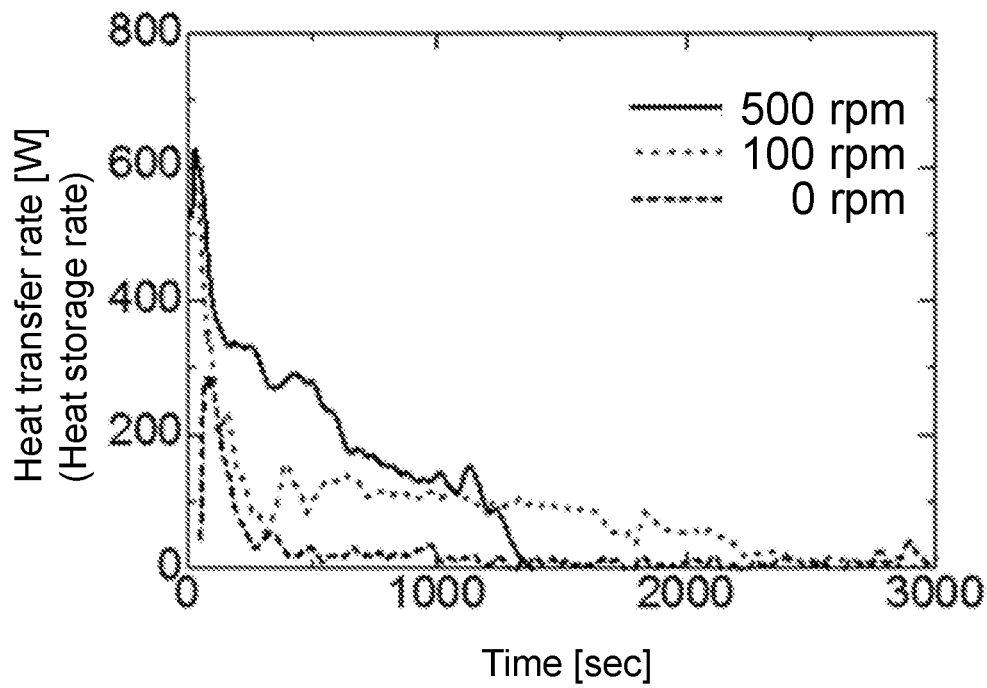
FIG. 9 is a graph showing changes in heat storage rate over time in heat storage tests conducted in Examples 5, 6, and Comparative Example 3.

Next, a heat storage test was conducted by flowing heated water at a temperature of 70° C. as the heat medium 8 in the heat transfer cylindrical body 1 at a flow rate of 1.0 L/min while rotating the heat transfer cylindrical body 1 at 500 rpm. An amount of heat storage was determined by measuring the temperature of the latent heat storage material 3 during this period, and a heat storage rate was further calculated. FIG. 9 shows a change in heat storage rate over time.

Example 6

A heat storage test was conducted in the same manner as in Example 5 except that the number of revolutions of the heat transfer cylindrical body 1 was changed to 100 rpm. An amount of heat storage was determined by measuring the temperature of the latent heat storage material 3 during this period, and a heat storage rate was further calculated. FIG. 9 shows a change in heat storage rate over time.

Comparative Example 3

A heat storage test was conducted in the same manner as in Example 5 except that the number of revolutions of the heat transfer cylindrical body 1 was changed to 0 rpm. An amount of heat storage was determined by measuring the temperature of the latent heat storage material 3 during this period, and a heat storage rate was further calculated. FIG. 9 shows a change in heat storage rate over time.

As apparent from the results shown in FIG. 9, it was confirmed that the heat storage progressed from an initial stage of the heat storage test by filling the void between the outer peripheral surface of the heat transfer cylindrical body 1 and the solidified body of the latent heat storage material 3 with the silicone oil. This is thought to be because the silicone oil put into the void between the outer peripheral surface of the heat transfer cylindrical body 1 and the solidified body of the latent heat storage material 3 promoted the heat transfer from the heat transfer cylindrical body 1 to the solidified body of the latent heat storage material 3.

Figure 10:
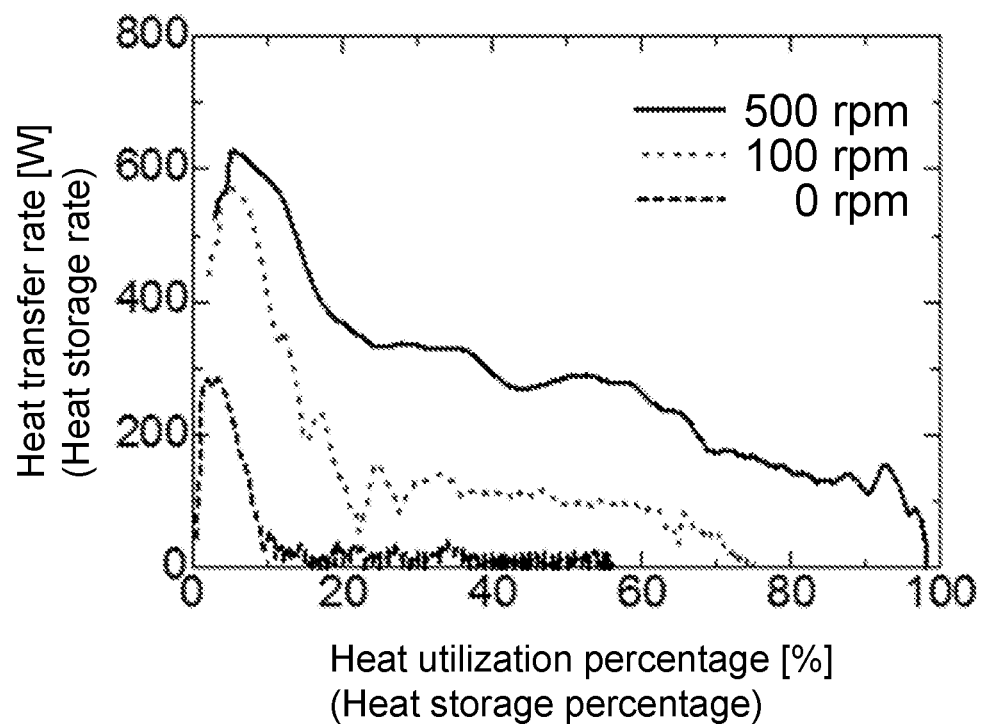
FIG. 10 is a graph showing a relation between a heat utilization percentage (a heat storage percentage) and the heat storage rate in the heat storage tests conducted in Examples 5, 6, and Comparative Example 3.

Meanwhile, regarding each of Examples 5, 6, and Comparative Example 3, the heat utilization percentage (a heat storage percentage) was determined by dividing the amount of heat storage of the latent heat storage material in each heat storage time by the sum of the sensible heat as well as the latent heat of the latent heat storage material. FIG. 10 shows relations between the heat utilization percentage (the heat storage percentage) and the heat storage rate. As apparent from the results shown in FIG. 10, it turned out that, by bringing the fused latent heat storage material in the vicinity of the outer peripheral surface of the heat transfer cylindrical body into the forced convection through rotating the heat transfer cylindrical body, a high heat transfer performance with a high heat transfer rate (heat storage rate) was maintained even when the heat utilization percentage (the heat storage percentage) was increased. On the other hand, a high heat transfer performance was not available in the case of no rotation because the heat transfer rate (the heat storage rate) was low even when the heat utilization percentage (the heat storage percentage) was low. From this result, it turned out that the latent heat storage device of the present invention could store a lot of heat energy at a practical rate. On the other hand, it turned that the heat energy storable at a practical rate was little in the case of no rotation of the heat transfer cylindrical body, that is, in the conventional latent heat storage device.

As apparent from the above-described results, regarding the latent heat storage device in which the latent heat storage material is disposed around the heat transfer cylindrical body allowing a flow of the heat medium inside thereof, it was confirmed that its heat transfer performance was significantly improved by installing the fixed blade in such a way as to be adjacent to or in slidable contact with the outer peripheral surface of the heat transfer cylindrical body and rotating the heat transfer cylindrical body, and hence by scraping off the solidified body of the latent heat storage material adhering to the outer peripheral surface at the time of heat release or by bringing the fused latent heat storage material in the vicinity of the outer peripheral surface into the forced convection at the time of heat storage.

INDUSTRIAL APPLICABILITY

As described above, according to the present invention, it is possible to obtain a latent heat storage device that brings about a large amount of heat release and has an excellent heat transfer performance between a latent heat storage material and a heat medium.

As a consequence, the latent heat storage device of the present invention is excellent in heat transfer performance between the latent heat storage material and the heat medium, and is therefore effective in the heat cascading. The latent heat storage device of the present invention is particularly useful for applications including: a heat transport system configured to store and transport industrial exhaust heat for civilian use; a system configured to store industrial exhaust heat and to use the stored heat on site as a heat source for an adsorption refrigerator and the like; a system configured to store heat by using low-price midnight power and to use the stored heat in the daytime when the price is high; a system for mitigating fluctuations of solar irradiation which is configured to store heat by using surplus power of solar power generation or heat obtained by solar concentration and to supply the heat when the sunlight is blocked out at any time of the day or night; and the like.

REFERENCE SIGNS LIST

1: heat transfer cylindrical body
1a: cylindrical container
2: fixed blade (outer fixed blade)
3, 3a: latent heat storage material
4: outer cylinder
4a: outer cylinder container
5a, 5b: blocking member
6: fixed blade (inner fixed blade)
7a, 7b: blocking member
8: heat medium
9a: heat medium introduction pipe
9b: heat medium outlet pipe

The invention claimed is:

1. A latent heat storage device comprising:
a heat transfer cylindrical body allowing a flow of a heat medium inside thereof and being rotatable about a longitudinal axis as a center of rotation;
a fixed blade being adjacent to or in a slidable contact with an outer peripheral surface of the heat transfer cylindrical body; and
a latent heat storage material disposed around the heat transfer cylindrical body, wherein
at a time of heat release, by rotation of the heat transfer cylindrical body, the fixed blade scrapes a solidified body of the latent heat storage material adhering to the outer peripheral surface of the heat transfer cylindrical body off the outer peripheral surface of the heat transfer cylindrical body, and by rotation of the heat transfer cylindrical body and by the fixed blade, circulation of the latent heat storage material is created to agitate the latent heat storage material;
at a time of heat storage, the latent heat storage material transformed from the solidified body into a liquid form in a vicinity of the outer peripheral surface of the heat transfer cylindrical body circulates by using the rotation of the heat transfer cylindrical body as a driving force, and the circulation of the latent heat storage material collides with the fixed blade to create a flow in a direction perpendicular to the outer peripheral surface of the heat transfer cylindrical body; and
a filler in liquid form and immiscible with the latent heat storage material is disposed between the outer peripheral surface of the heat transfer cylindrical body and the latent heat storage material.

2. The latent heat storage device according to claim 1, wherein a width of the fixed blade is equal to or above 15% of a diameter of the heat transfer cylindrical body.

3. The latent heat storage device according to claim 1, wherein an outer cylinder is disposed around the heat transfer cylindrical body while providing a given space in between, and the fixed blade and the latent heat storage material are disposed in the space between the heat transfer cylindrical body and the outer cylinder.

4. The latent heat storage device according to claim 3, wherein a width of the fixed blade is not less than 30% and not more than 100% of a width of the space between the heat transfer cylindrical body and the outer cylinder.

5. The latent heat storage device according to claim 1, wherein one end portion of the heat transfer cylindrical body is closed, and a heat medium introduction pipe configured to introduce the heat medium from another end portion of the heat transfer cylindrical body into the vicinity of the closed end portion in the heat transfer cylindrical body is disposed in the heat transfer cylindrical body, and the heat medium flows from the vicinity of the closed end portion to the other end portion in the heat transfer cylindrical body by introducing the heat medium into the heat transfer cylindrical body through the heat medium introduction pipe.

\* \* \* \* \*